United States Patent [19]

Tierney

[11] Patent Number: 5,713,980
[45] Date of Patent: Feb. 3, 1998

US005713980A

[54] FLEXIBLE COMPOSTING MAT AND METHOD FOR USING SAME

[76] Inventor: Gene P. Tierney, 2516 W. 22nd St., Minneapolis, Minn. 55405

[21] Appl. No.: 986,143

[22] Filed: Dec. 4, 1992

[51] Int. Cl.⁶ ..................................................... C05F 17/00
[52] U.S. Cl. ....................................................... 71/9
[58] Field of Search ........................... 47/9; 71/9, DIG. 1; 504/116; 428/131; 383/4, 16, 100, 117, 75

[56] References Cited

U.S. PATENT DOCUMENTS

| | | | |
|---|---|---|---|
| D. 258,409 | 3/1981 | Nattrass | D7/194 |
| D. 297,378 | 8/1988 | Briscoe | D34/11 |
| 807,423 | 12/1905 | Fern | 209/329 |
| 876,180 | 1/1908 | Hemenway et al. | 110/240 |
| 1,227,323 | 5/1917 | Russell | 248/137 |
| 1,970,727 | 8/1934 | Bates | 110/19 |
| 2,851,186 | 9/1958 | Rupe, Jr. | 220/4 |
| 3,837,810 | 9/1974 | Richards et al. | 71/9 |
| 4,060,945 | 12/1977 | Wilson | 52/169.5 |
| 4,408,774 | 10/1983 | Raskob | 280/47.26 |
| 4,481,117 | 11/1984 | Collins | 210/776 |
| 4,602,664 | 7/1986 | Hullen | 428/131 |
| 4,683,674 | 8/1987 | Faul | 47/83 |
| 5,050,999 | 9/1991 | Van Loon, III | 383/76 |

OTHER PUBLICATIONS

Advertisement for Ro–Si Composter in *The Plow & Hearth*, Fall 1990, p. 16.
"Composting" brochure, Minnesota Nursery and Landscape Assn., 1989.
"Backyard Composting" brochure No. AG–FA–3899, by D. Brown and C. Rosen, Minnesota Extension Service, University of Minnesota, 1990.
"Step–by–Step Urban Compost", R. Davis, *Horticulture*, pp. 58–59, Dec. 1986.
Brown et al. "Backyard Composting" brochure No. AG–FS–3899, Minnesota Extension Service, Univ. of Minnesota, 1990.
Davis, "Step–by–Step Urban Compost", Horticulture, pp. 58–59, Dec. 1986.

*Primary Examiner*—S. Mark Clardy
*Attorney, Agent, or Firm*—Schwegman, Lundberg, Woessner, & Kluth, P.A.

[57] ABSTRACT

A method and apparatus for aerating organic material. A flexible composting mat having netting and handles disposed on opposite sides of the netting is provided to retain organic materials. The organic materials are placed on the netting and the mat is closed for an appropriate period of decomposition. The mat is then opened, and the organic materials are rolled by pulling on the handles, thus aerating the organic material.

15 Claims, 3 Drawing Sheets

FLEXIBLE COMPOSTING MAT AND METHOD FOR USING SAME

FIELD OF THE INVENTION

This invention relates to a flexible composting mat, and more particularly to a method and apparatus for aerating organic material.

BACKGROUND OF THE INVENTION

Gardeners have been composting for centuries to increase organic matter in their soil and to provide essential nutrients which promote plant growth. Composting is a natural process of decomposition and recycling of organic material into a rich soil amendment known as compost. With modern trends toward recycling, composting is becoming more and more common.

Composting is a process that allows naturally occurring microbes to convert yard waste to a useful organic mulch. This mulch benefits the soil in a number of ways: increasing organic matter, building sound root structure for trees, aerating clay soils to improve drainage, balancing soil pH, reducing the water demands of plants and trees, helping control soil erosion, and reducing reliance upon petroleum-based fertilizers.

Approximately 30% of the typical United States household trash can be composted, including yard clippings, kitchen scraps, and paper towels. With bans on outdoor burning in many communities and limits on dumping yard clippings in landfills, composting has become a logical alternative for the disposal of yard waste. Composting is becoming much more popular as people are becoming more environmentally conscious. While in 1988, just over 25,000 compost bins were sold in North America, an estimated 700,000 will be sold in 1992.

Four important factors for achieving optimum composting include: small particle size, moisture, fertilizer, and aeration. Small particle size is important because microbes decompose organic matter more quickly when maximum particle surface area is exposed. A chopper or shredder is often used to achieve this end. A proper level of moisture is also important to the decomposition process. When rainfall is inadequate a garden hose can be used to moisten the compost pile. Nitrogen fertilizer, such as properly mixed grass clippings, are added because microbes which aid in the decomposition of organic matter need nitrogen for their metabolism. Finally, aeration is critical in speeding up the decomposition rate. A loose, well mixed pile of compost will increase the flow of oxygen, allowing the compost pile to reach high internal temperatures, thus increasing the decomposition rate. The absence of oxygen will create a foul smelling compost, as well as slow the decomposition process down.

A number of methods have been employed to aerate a compost pile. One method is to turn the compost pile using a pitch fork or shovel. Another method is to poke holes into the pile using a pitchfork, rod, or similar tool. Shipping pallets or branches are often placed underneath compost piles to increase the air flow within them. Raised, rotating drums have also been proposed as a way of mixing organic waste to aid in the aeration process (see U.S. Pat. No. 3,837,810). However, such an apparatus is relatively complicated and expensive.

What has been needed is a simple, mess free, and inexpensive way of aerating organic material to assist in the decomposition process.

SUMMARY OF THE INVENTION

The present invention provides a method and apparatus for aerating organic material using a flexible composting mat.

The preferred apparatus of the present invention comprises flexible netting for supporting the organic material and at least two handles for rolling the organic material. The flexible netting is preferably of a sufficient porosity to hold the organic material, while allowing free exchange of air and water through its apertures. The handles are preferably attached near the periphery of the flexible composting mat and are preferably approximately opposite each other.

In the method of the present invention, the flexible composting mat is spread, exposing the upper surface of the flexible netting to receive the organic material. Organic materials such as leaves, grass clippings, soil, and nitrogen fertilizers are then placed in a pile in the center of the flexible netting. Preferably, the composting mat is closed over the organic material until, after an appropriate period of decomposition, the compost pile is ready to be turned. At that time, the composting mat is opened so that the compost can be aerated.

Aeration is accomplished by gripping a handle on the flexible composting mat and pulling the handle until the organic material is rolled. A handle on approximately the opposite side of the flexible composting mat may then be pulled to roll the organic material to about its original position. The result of this rolling and churning of the organic materials in a compost pile is to aerate the organic materials. This aids in the decomposition process and prevents the occurrence of a foul smell.

DETAILED DESCRIPTION OF THE PREFERRED EMBODIMENT

The present invention relates to an improved method and apparatus for aerating organic material for composting. The composting process is described in "Composting" a brochure from the Minnesota Nursery and Landscape Association, 1989, "Backyard Composting" brochure No. AG-FS-3899 by D. Brown and C. Rosen, Minnesota Extension Service, University of Minnesota, 1990, and "Step-By-Step Urban Compost", R. Davis, *Horticulture*, pp. 58–59, December 1986, all of which are incorporated by reference.

Figure 1:
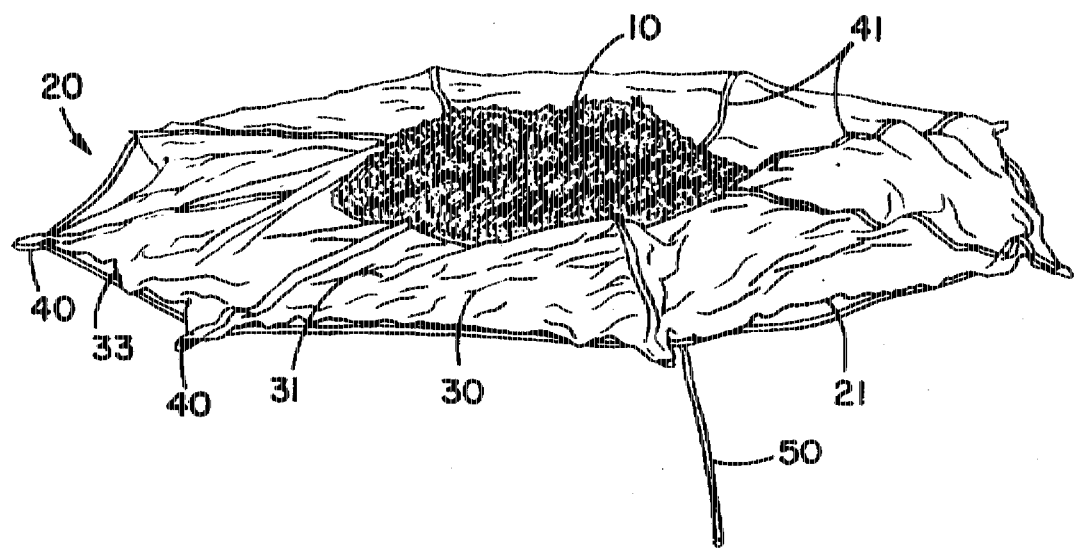
FIG. 1 is a perspective view of the preferred flexible composting mat shown with compost.
Figure 2:
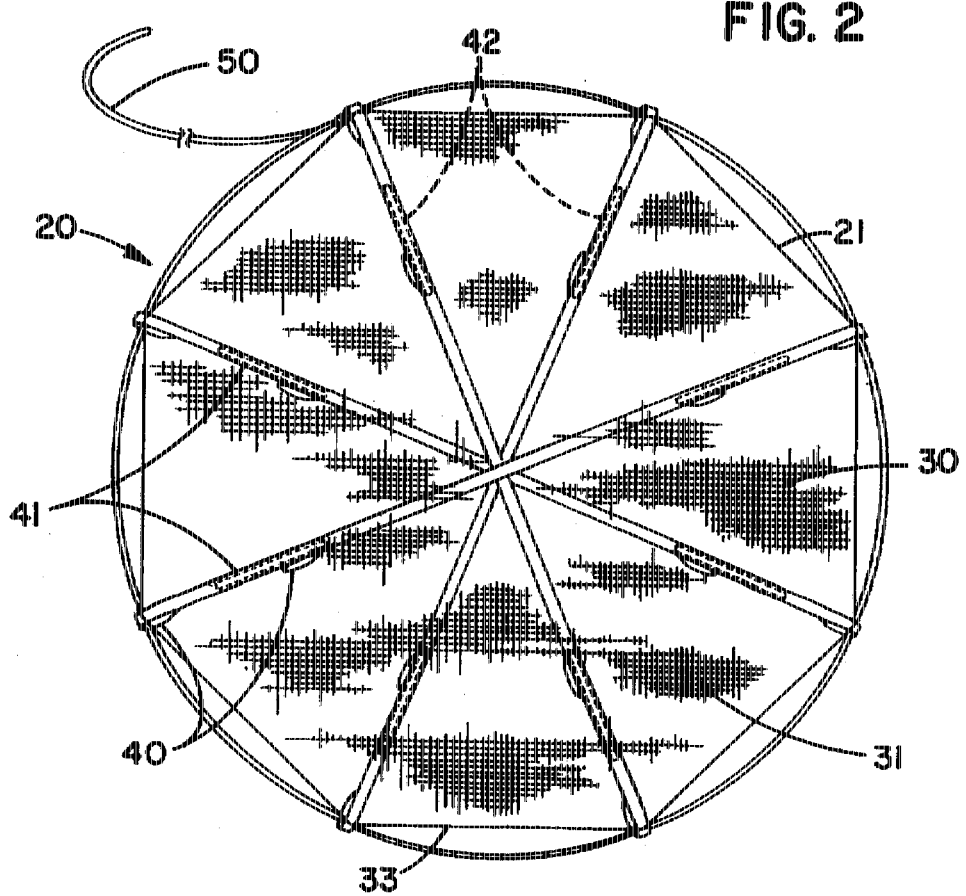
FIG. 2 is a top view of the flexible composting mat in FIG. 1.

Referring now to the drawings, and particularly to FIGS. 1 and 2, there is illustrated the first preferred flexible composting mat 20. Although the first preferred flexible composting mat 20 is of an octagonal shape, those skilled in the art will recognize that various configurations are possible, including circles, ovals and various polygons.

The flexible composting mat 20 illustrated in connection with the first embodiment preferably includes netting 30, handles 40, and a draw string 50. The netting 30 is preferably manufactured from a non-biodegradable mesh or netting material. Although the netting 30 in the preferred embodiment is manufactured from a polyester, those skilled in the art will recognize that a variety of non-biodegradable materials may be substituted. The first preferred embodiment employs forty-four pound Delta nylon netting which has been edged and treated. Preferably, the porosity of the netting is sufficiently small to contain the organic material 10 within the flexible composting mat 20 while being sufficiently large to allow a free exchange of air, water, microbes, and earthworms from the outside environment. The preferred aperture size range of the netting 30 is between ⅛" and ½".

The handles 40 in the first preferred embodiment are constructed from nylon straps 41 extending across the lower surface 32 of the netting 30. The handles 40 are formed by looping the straps 41 which are sewn to the netting 30. Also, in the first preferred embodiment, the seam of the netting 30 is sewn under one of the straps 41. It will be understood by those skilled in the art that the handles 40 may be constructed of various materials and may be attached to the netting 30 in a variety of ways and locations. Further, various numbers of handles 40 could be employed.

The first preferred embodiment includes a drawstring 50 used to enclose the organic material 10 inside the flexible composting mat 20, although those skilled in the art will recognize that closure can be accomplished in a variety of ways, including simply folding the netting 30 over the organic material 10. The drawstring 50 in the first preferred embodiment is threaded through the outer handles 40 adjacent to the peripheral edge 21 of the flexible composting mat 20. Those skilled in the art, however, will recognize that the drawstring 50 can be attached to the peripheral edge 21 in a variety of other ways, such as disposing the drawstring 50 through a channel formed in the periphery 33 of the netting 30. The drawstring 50 in the preferred embodiment is constructed of nylon, but a variety of materials may be substituted.

The first preferred embodiment may also include a plurality of elongate rigid members 42 which are disposed in a radial direction from the center of the flexible composting mat 20 as shown in FIG. 2. The rigid members 42 provide lateral support to the organic material 10 when the flexible composting mat 20 is closed. The rigid members 42 are preferably disposed from the outer perimeter of the typical organic pile to a position inward from the peripheral edge 21 of the flexible composting mat 20. In the preferred embodiment, the rigid members 42 are attached to each of the straps 41. It will be understood by those skilled in the art, however, that the rigid members 41 can be attached to the flexible netting 30 in a variety of ways. When the flexible composting mat 20 is closed, the rigid members 42 provide support around the circumference of the organic material 10, thus creating an up-standing cylindrical structure with increased surface area.

The preferred method for aerating organic material 10 described by the present invention begins with providing the first preferred flexible composting mat 20, illustrated in FIG. 1. The flexible composting mat 20 is then spread so that its upper surface 31 is exposed to receive the organic material 10. Those skilled in the art will recognize that the flexible composting mat 20 may be spread on a surface or suspended. Further, the surface need not be flat and the flexible composting mat 20 only need be spread sufficiently to receive the organic material 10 on its upper surface 31.

Next, the organic material 10 is placed on the upper surface 31 of the netting 30. Those skilled in the art will recognize that a variety of organic materials 10 and a variety of recipes may be used for composting. The flexible composting mat 20 is then closed over the organic material 10 until, after an appropriate period of decomposition, the organic material 10 is ready to be turned. Those skilled in the art will recognize that the organic material 10 may be left in the pile for different lengths of time before aeration is necessary, depending upon the ingredients and methods used. At that time, the flexible composting mat 20 is again opened and spread, so that the organic material 10 can be aerated.

Figure 3:
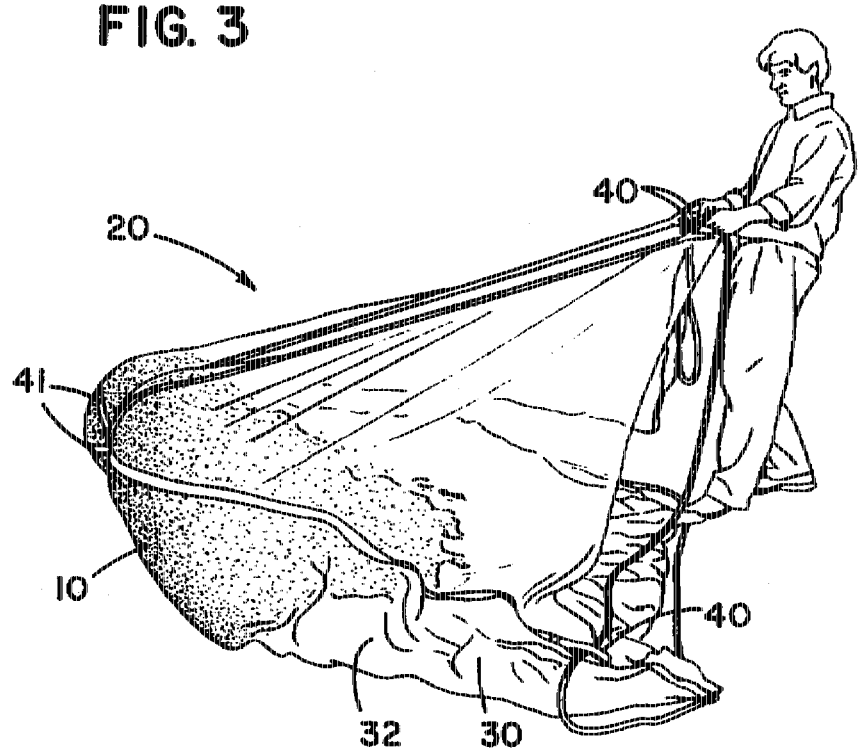
FIG. 3 illustrates a person aerating the compost using the preferred flexible composting mat in FIG. 1.

Aeration is then accomplished by gripping the handles 40 on one side of the flexible composting mat 20 and pulling the handles 40 until the organic material 10 rolls. Those skilled in the art will recognize that a single handle 40 would be sufficient for this purpose. In accomplishing rolling of the organic material 10, the handles 40 are preferably pulled over and beyond the organic material 10, as illustrated in FIG. 3. It will be understood by those skilled in the art, however, that the same result can be accomplished by pulling the handles 40 in a generally vertical direction. Preferably, the handles 40 on the opposite side of the flexible composting mat 20 are then similarly pulled to coax the organic material 10 to approximately its original position. However, it will be understood by those skilled in the art that aeration can be accomplished by pulling the handles 40 in a variety of ways and in various sequences.

Figure 4:
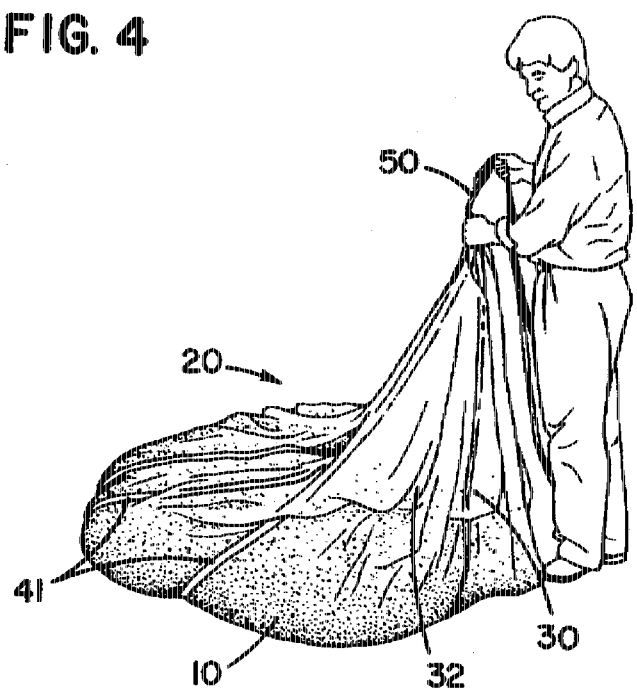
FIG. 4 illustrates the person closing the flexible composting mat after aeration to allow continued composting.

After the organic material 10 has been aerated, the flexible composting mat 20 is preferably closed by pulling the drawstring 50 to close the flexible composting mat 20 around the organic material 10, as shown in FIG. 4. Those skilled in the art will recognize that closure can be accomplished in a variety of other ways, such as snaps, clips, or Velcro®.

Figure 5:
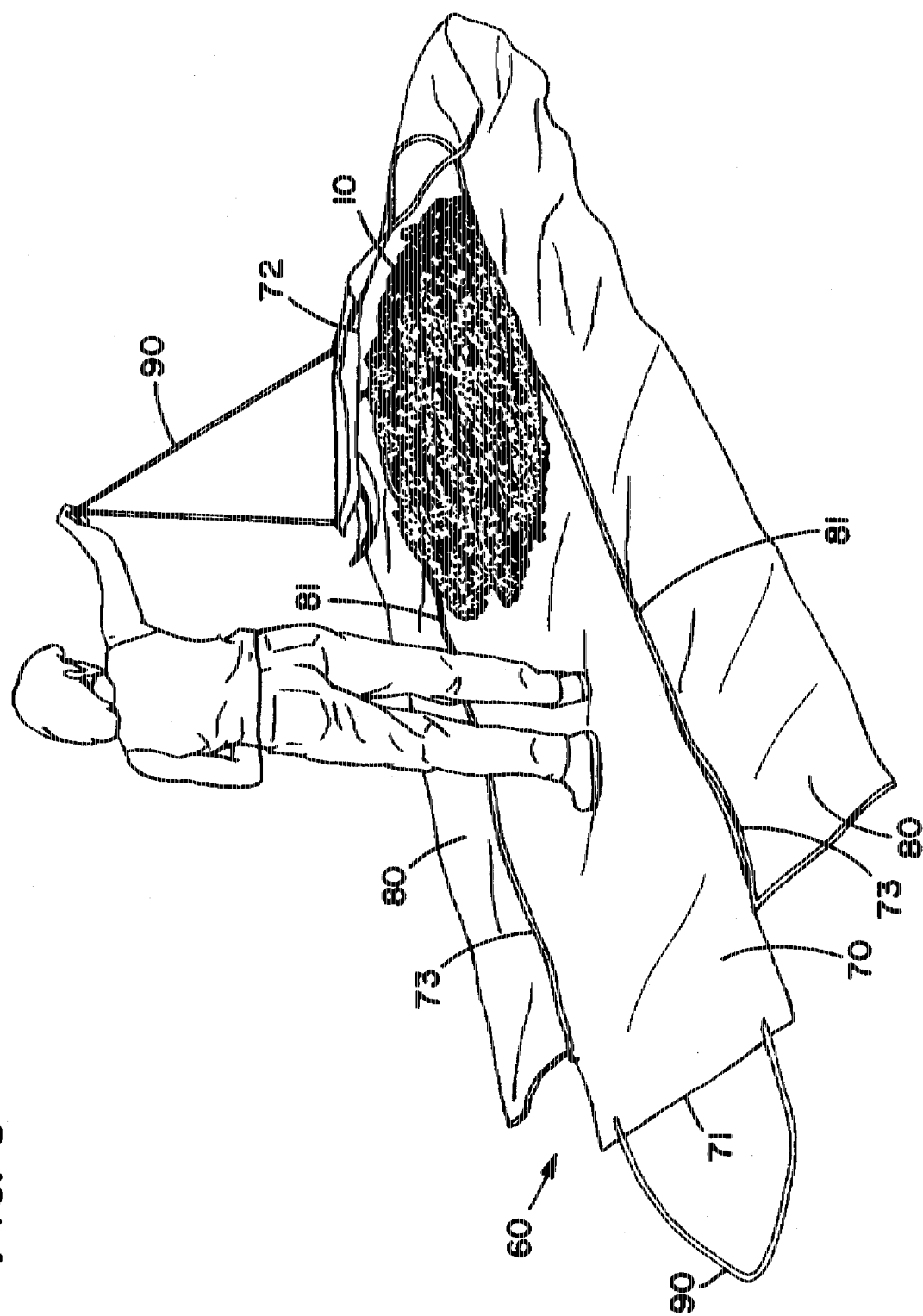
FIG. 5 is a perspective view of a person using a second embodiment of a flexible composting mat to aerate compost.

The second preferred flexible composting mat 60 is illustrated in FIG. 5. The second preferred embodiment is of a generally rectangular shape and includes netting 70, mesh side panels 80, and handles 90. The netting 70 of the second preferred embodiment is constructed of polyethylene. Those skilled in the art will recognize that a similarly rigid non-biodegradable netting 70 may be used.

The second preferred embodiment employs mesh side panels 80 which close over the organic material 10. The inner edges 81 of the mesh side panels 80 are preferably attached to the opposing side edges 73 of the netting 70. Those skilled in the art will recognize that the mesh side panels 80 may be attached to the netting 70 in a variety of ways and may be attached at points inward from the opposing side edges 73. Further, the netting 70 and mesh side panels 80 may comprise one continuous piece of material.

The handles 90 on the second preferred embodiment are attached to approximately the front edge 71 and back edge 72 of the netting 70. Although the second preferred embodiment employs a continuous nylon rope attached at opposite ends to the netting 70, it will be understood by those skilled in the art that a variety of materials or handles could be substituted.

Aeration is similarly accomplished using the second preferred embodiment by pulling the handle 90 at one end, preferably over and beyond the organic material 10 until the organic material 10 is rolled. Again, those skilled in the art will recognize that a similar result can be accomplished by pulling the handle 90 in a generally vertical direction. The organic material 10 may be further aerated by pulling the handles 90 to roll the organic material 10 any number of times.

Closure of the second preferred embodiment is accomplished by closing the mesh panels 80 over the organic material 10 and then rolling the front edge 71 and back edge 72 of the netting 70 up to the organic material 10. It will be understood by those skilled in the art that the second preferred embodiment could be closed in a variety of ways including, by way of example, folding the netting 70 and/or mesh side panels 80 over the organic material 10.

It will be understood by those skilled in the art that the present invention is not limited to the examples discussed above, which are illustrative only. Changes may be made in detail, especially in matters of shape, size, arrangement of parts, and material of components within the principles of the invention, to the full extent indicated by the broad general meanings of the terms in which the appended claims are expressed.

What is claimed is:

1. A method for aerating organic material using a flexible composting mat during a composting cycle comprising the steps of:

(a) providing a non-biodegradable flexible composting mat comprising netting means for supporting composted organic material and fertilizer during the composting cycle, first and second handle means for rolling the organic material, and a peripheral edge, said netting means having an upper and lower surface and apertures of less than ½ inch;

(b) spreading said flexible composting mat so that said upper surface of said netting means is exposed to receive the organic material;

(c) placing the organic material on said upper surface of said netting means.

(d) closing said flexible composting mat over the organic material for an appropriate period of decomposition;

(e) opening and spreading said flexible composting mat, the organic material and said spread composting mat defining an original position; and (f) gripping said first handle means of said flexible composting mat and pulling said first handle means to roll the organic material from said original position to a second position.

2. The method of claim 1, further comprising the step of gripping said second handle means of said flexible composting mat and pulling said second handle means to roll the organic material from said second position to generally said original position.

3. The method of claim 1, wherein said flexible composting mat includes closure means for closing said flexible composting mat over the organic material.

4. The method of claim 3, wherein said closure means include a drawstring disposed at generally said peripheral edge of said flexible composting mat, further comprising the step of pulling said drawstring to close said flexible composting mat around and over the organic matter.

5. The method of claim 1 wherein said flexible composting mat is of a generally circular shape.

6. The method of claim 1 wherein said netting means is of sufficient porosity to contain the organic material, while allowing free exchange of air and water through said netting means.

7. The method of claim 6 wherein said netting means comprise apertures of approximately between ⅛" and ½".

8. The method of claim 7 wherein said netting means is constructed of polyester mesh.

9. The method of claim 1 wherein said first and second handle means are attached at generally said peripheral edge of said flexible composting mat and are approximately opposite each other.

10. The method of claim 1 wherein said flexible composting mat includes a plurality of elongate rigid members radially attached to said netting means, said elongate rigid members providing circumferential support when said flexible composting mat is closed, thereby defining a generally cylindrical structure.

11. The method of claim 1 wherein said flexible composting mat is of a generally rectangular shape, comprising netting means having a front edge, a back edge, and a pair of opposing side edges.

12. The method of claim 11, wherein said flexible composting mat includes side panel means for closing said flexible composting mat over said organic matter.

13. The method of claim 12, wherein said side panel means comprise at least two mesh panels having inner edges, said mesh panels being oppositely attached proximate said inner edges to said opposing side edges of said netting means.

14. The method of claim 13, further comprising the steps of closing said mesh panels over the organic matter and rolling said front and back edges of said netting means to approximately the organic matter.

15. The method of claim 11, wherein said first and second handle means are attached proximate said front and back edges of said netting means, respectively.

* * * * *